US012488655B2

(12) United States Patent
Huke et al.

(10) Patent No.: US 12,488,655 B2
(45) Date of Patent: Dec. 2, 2025

(54) METHOD, SYSTEM AND APPARATUS TO AUTHENTICATE LARGE BETS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 307 days.

(21) Appl. No.: 18/308,790

(22) Filed: Apr. 28, 2023

(65) Prior Publication Data

US 2023/0267804 A1 Aug. 24, 2023

Related U.S. Application Data

(63) Continuation-in-part of application No. 17/530,977, filed on Nov. 19, 2021, now Pat. No. 11,663,883.

(60) Provisional application No. 63/116,344, filed on Nov. 20, 2020.

(51) Int. Cl.
*G07F 17/32* (2006.01)

(52) U.S. Cl.
CPC ...... *G07F 17/3241* (2013.01); *G07F 17/3237* (2013.01)

(58) Field of Classification Search
None
See application file for complete search history.

(56) References Cited

U.S. PATENT DOCUMENTS

| | | | |
|---|---|---|---|
| 10,394,648 B2 | 8/2019 | Niu et al. | |
| 11,195,379 B1 | 12/2021 | Huke et al. | |
| 12,211,337 B2 * | 1/2025 | Ramos | G07F 17/42 |
| 2005/0181870 A1 | 8/2005 | Nguyen et al. | |
| 2016/0078444 A1 | 3/2016 | Tomasofsky et al. | |
| 2020/0219362 A1 | 7/2020 | Simons | |
| 2020/0302747 A1 * | 9/2020 | Leen | G07F 17/3237 |
| 2020/0357246 A1 | 11/2020 | Nelson et al. | |
| 2020/0364988 A1 | 11/2020 | Nelson et al. | |
| 2023/0135783 A1 * | 5/2023 | Chen | G06F 16/489 707/736 |
| 2024/0135783 A1 * | 4/2024 | Corlett | G07F 17/3211 |

OTHER PUBLICATIONS

International Search Report and Written Opinion issued on Feb. 8, 2022, in connection with corresponding International Patent Application No. PCT/US2021/060109; 8 pages.

* cited by examiner

*Primary Examiner* — Ronald Laneau
(74) *Attorney, Agent, or Firm* — Maier & Maier, PLLC

(57) ABSTRACT

A system that allows a user to set threshold preferences for wager limits and the amount of time a wager is placed to allow the user to authenticate or identify themselves when the thresholds are exceeded to reconfirm that the user wishes to place a wager. The system compares the wagers placed by the user to thresholds inputted by the user. If the wager parameters exceed the inputted thresholds, the wagering network reconfirms the wager with the user by requesting a means of authentication to ensure that it is the user placing the wager and determining if the user wants to place the wager and that it was not placed in error.

20 Claims, 4 Drawing Sheets

A system for authenticating large bets

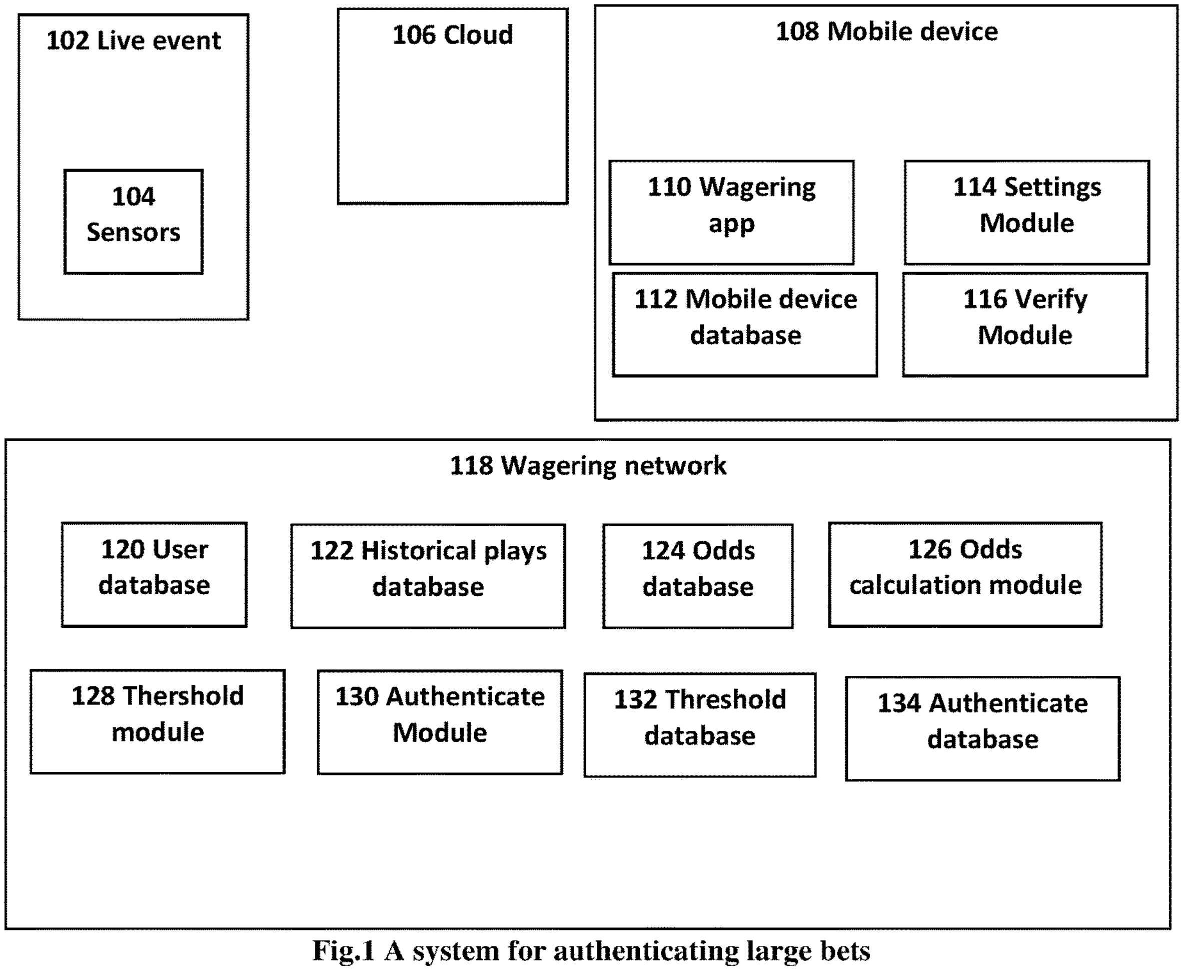
Fig.1 A system for authenticating large bets

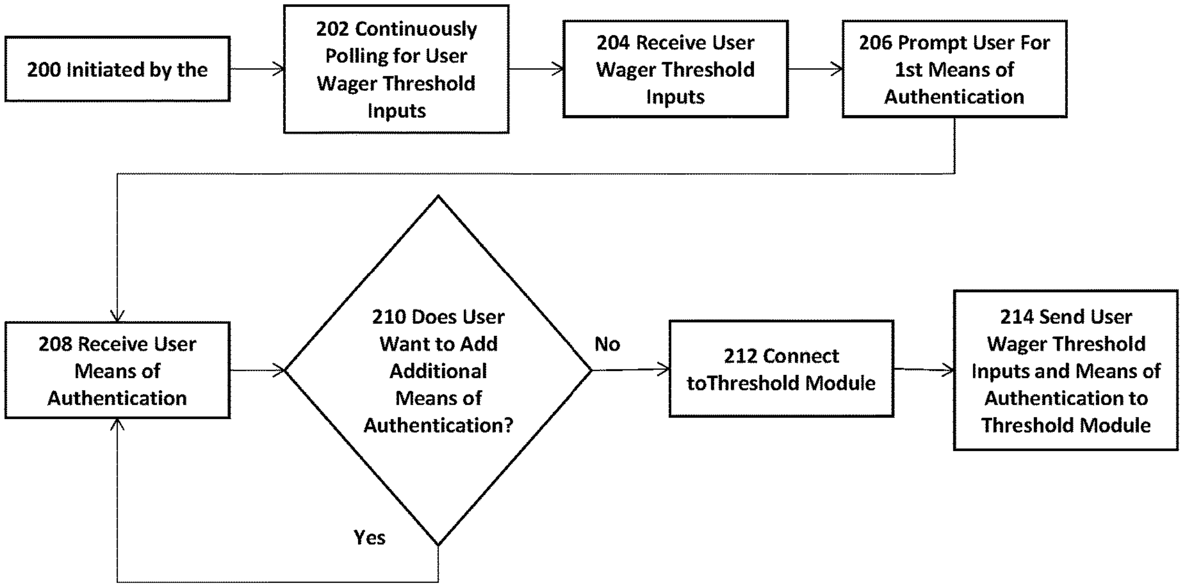
Fig.2 Settings Module
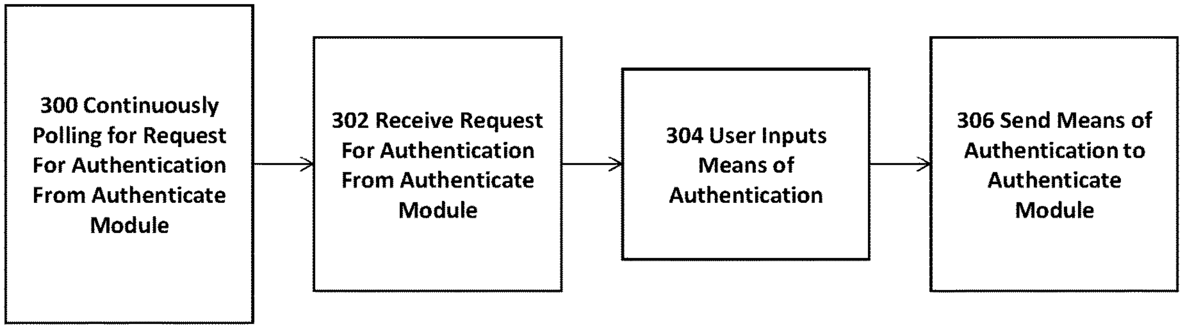
Fig.3 Verify Module

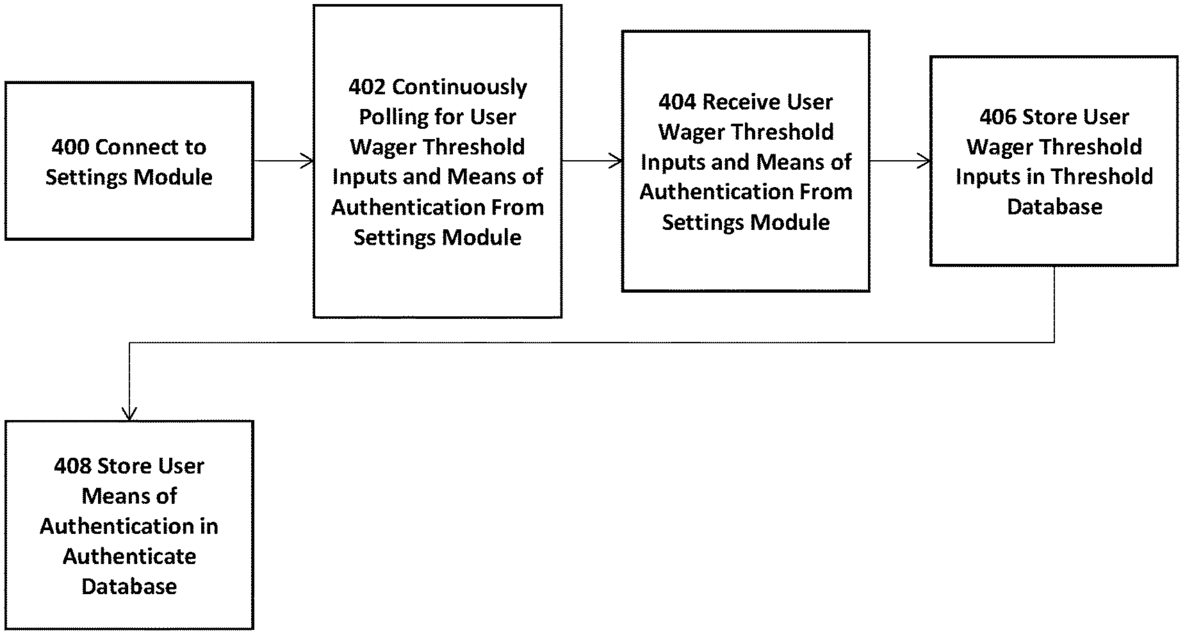
Fig.4 Threshold Module
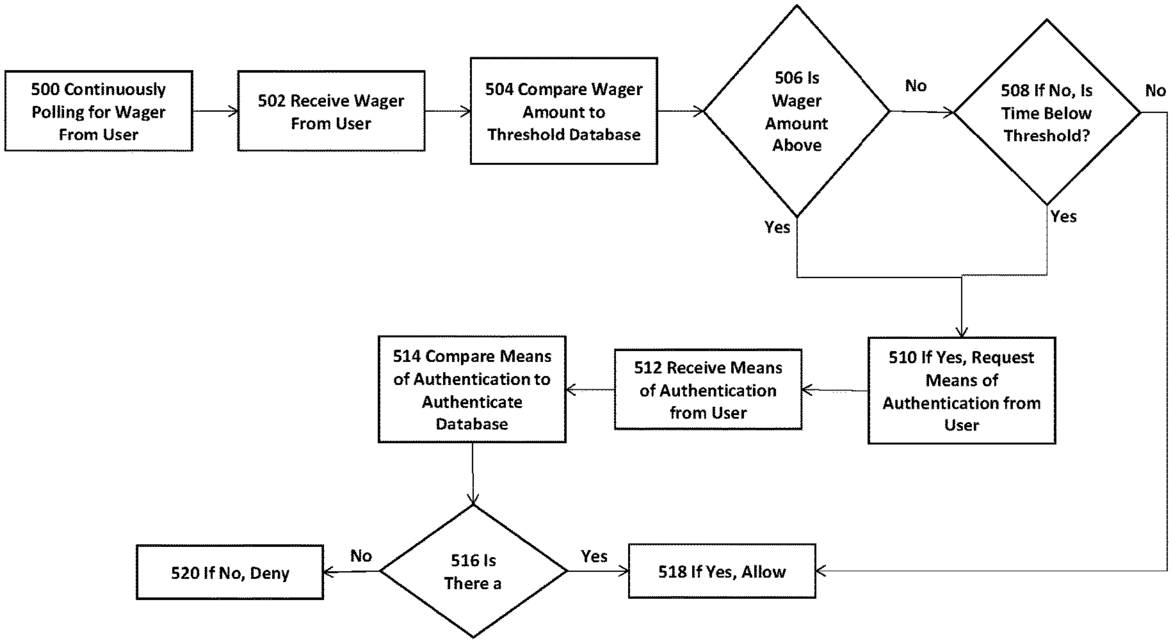
Fig.5 Authenticate Module

| User ID | Wager Amount | Wager Time |
|---|---|---|
| JS1234 | $100 | 10 seconds |
| LK0987 | $200 | 15 seconds |
| TB4567 | $150 | 10 seconds |
| - | - | - |
| - | - | - |
| - | - | - |

Fig.6 Threshold Database

| User ID | Passcode | Biometric 1 | Biometric 2 | Biometric N |
|---|---|---|---|---|
| JS1234 | 1234abc! | Fingerprint.data | Facial.data | Iris.data |
| LK0987 | 9876ght? | Iris.data | Fingerprint.data | Facial.data |
| TB4567 | 4567yte+ | Facial.data | Iris.data | Fingerprint.data |
| - | - | - | - | - |
| - | - | - | - | - |
| - | - | - | - | - |

Fig.7 Authenticate Database

METHOD, SYSTEM AND APPARATUS TO AUTHENTICATE LARGE BETS

FIELD

The present embodiments are generally related to play-by-play wagering on live sporting events.

BACKGROUND

Currently, an issue with wagering platforms and applications is that there is no system to authenticate large bets if the user is logged into the platform or application.

Further, wagering platforms and applications lack preferences set by the user to request a reconfirmation of a large wager. The user is left to trust themselves not to place wagers that are too large.

Lastly, there is no way to prompt a user to identify themselves if a large wager is placed in a short amount of time.

Thus, there is a need in the prior art to have a system in place to authenticate large bets places by users on a wagering platform or application.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates a system for authenticating large bets, according to an embodiment.

FIG. 2 illustrates a settings module, according to an embodiment.

FIG. 3 illustrates a verify module, according to an embodiment.

FIG. 4 illustrates a threshold module, according to an embodiment.

FIG. 5 illustrates a authenticate module, according to an embodiment.

FIG. 6 illustrates a threshold database, according to an embodiment.

FIG. 7 illustrates a authenticate database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cash-back to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for authenticating large bets. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 118 to place bets and provide payment/receive funds based on wager outcomes.

Further, embodiments may include a mobile device database 112 that may store some or all the user's data, the live event 102, or the user's interaction with the wagering network 118.

Further, embodiments may include a settings module 114, which may begin with the settings module 114 being initiated by the user. For example, the user may select the settings option on the wagering app 110 to adjust their preferences. In some embodiments, the threshold and authentication preferences may be listed as a security setting to prevent the user from placing wagers that are too high or to limit the wager amounts. The settings module 114 may continuously poll for the user to input the wager thresholds. For example, the user may input thresholds for the amount of money wagered on one bet, such as $100. Also, the user may input threshold time limits, such as if the bet is placed within 10 seconds of the wager being available to the user. These limits may prevent the user from making impulse decisions that are previously deemed inappropriate for the user to make. The settings module 114 may receive the user wager threshold inputs. For example, the user sets the wager amount threshold to be $100 and the time limit threshold to be 10 seconds from when the wager became available to the user, thereby potentially allowing the user to be notified of the bet and authenticate the bet. This authentication process may allow the user a second opportunity to determine if the wager should be placed. The settings module 114 may prompt the user for the first means of authentication. For example, the means of authentication may be a numeric, letter, or special character passcodes, such as "1234abc!" or a combination thereof. The means of authentication may also be a biometric measure of the user, such as fingerprint, facial recognition, voice recognition, iris recognition, etc. The settings module 114 may receive the means of authentication from the user. For example, the means of authentication may be a numeric, letter, or special character passcodes, such as "1234abc!" or a combination thereof. The means of authentication may also be a biometric measure of the user, such as fingerprint, facial recognition, voice recognition, iris recognition, etc. is the settings module 114 may determine if the user wants to add another means of authentication. If the user wants to add another means of authentication, then the process may return to receive the user's means of authentication. For example, the user may desire to add another means of authentication, such as a numeric, letter, or special character passcodes, such as "1234abc!" or a combination thereof. The means of authentication may also be a biometric measure of the user, such as fingerprint, facial recognition, voice recognition, iris recognition, etc. If the user does not want to add another means of authentication, the settings module 114 may connect to the threshold module 128. The settings module 114 may send the user wager threshold inputs and means of authentication to the threshold module 128. For example, the settings module 114 may send the threshold such as the amount of money wagered on one bet, such as $100. Also, the user may input threshold time limits, such as if the bet is placed within 10 seconds of the wager being available to the user. The means of authentication, such as a numeric, letter, or special character passcodes, such as "1234abc! or a combination thereof. The means of authentication may also be a biometric measure of the user, such as fingerprint, facial recognition, voice recognition, iris recognition, etc.

Further, embodiments may include a verify module 116, which may begin with the verify module 116 continuously polling for a request for authentication from the authenticate module 130. For example, the authenticate module 130 may request authentication from the user if the wager placed exceeds the thresholds set by the user in the settings module 114. For example, suppose the user wishes for the wager to be placed. In that case, the user may need to present one or multiple means of authentication such as numeric, letter, or special character passcodes, such as "1234abc!" or a combination thereof. The means of authentication may also be a biometric measure of the user, such as fingerprint, facial recognition, voice recognition, iris recognition, etc. The verify module 116 may receive a request for authentication from the authenticate module 130. For example, the verify module 116 may receive a request for a means of authentication such as a numeric, letter, or special character passcodes, such as "1234abc!" or a combination thereof. The means of authentication may be biometric of the user, such as fingerprint, facial recognition, voice recognition, iris recognition, etc. The user may input the means of authentication. For example, the user may input numeric, letter, or special character passcodes, such as "1234abc!" or a combination thereof. The means of authentication may also be a biometric measure of the user, such as fingerprint, facial recognition, voice recognition, iris recognition, etc. The verify module 116 may send the means of authentication to the authenticate module 130. For example, the verify module 116 may send the means of authentication, such as a numeric, letter, or special character passcodes, such as "1234abc!" or a combination thereof. The means of authentication may also be a biometric measure of the user, such as fingerprint, facial recognition, voice recognition, iris recognition, etc.

Further, embodiments may include the wagering network 118, which may perform real-time analysis on the type of play and the result of a play or action. The wagering network 118 (or the cloud 106) may also be synchronized with game situational data, such as the time of the game, the score, location on the field, weather conditions, and the like, which may affect the choice of play utilized. For example, in an exemplary embodiment, the wagering network 118 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 118 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 120, which may contain data relevant to all users of the wagering network 118 and may include, but is not limited to, a user ID, a device identifier, a paired device identifier, wagering history, or wallet information for the user. The user database 120 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 120 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 120 may include, but is not limited to, information related to all the users involved in the live event 102. In one exemplary embodiment, the user database 120 may include information for generating a user authenticity report and a wagering verification report. Further, the user database 120 may be used to store user statistics like, but not limited to, the retention period for a particular user, frequency of wagers placed by a particular user, the average amount of wager placed by each user, etc.

Further, embodiments may include a historical plays database 122 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 124—that contains the odds calculated by an odds calculation module 126—to display the odds on the user's mobile device 108 and take bets from the user through the mobile device wagering app 110.

Further, embodiments may include the odds calculation module 126, which utilizes historical play data to calculate odds for in-play wagers.

Further, embodiments may include a threshold module 128, which may begin with the threshold module 128 connecting to the settings module 114. The threshold module 128 may continuously poll for the user's wager threshold and means of authentication. For example, the threshold module 128 may continuously poll from the settings module 114 for thresholds such as the amount of money wagered on one bet, such as $100, time limits, such as if the bet is placed within 10 seconds of the wager being available to the user, and the means of authentication, such as a numeric, letter, or special character passcodes, such as "1234abc!" or a combination thereof, or a biometric measure of the user, such as fingerprint, facial recognition, voice recognition, iris recognition, etc. The threshold module 128 may receive the user's wager threshold and the user's means of authentication. For example, the threshold module 128 may receive thresholds from the settings module 114, such as the amount of money wagered on one bet, such as $100, time limits, such as if the bet is placed within 10 seconds of the wager being available to the user, and the means of authentication, such as a numeric, letter, or special character passcodes, such as "1234abc!" or a combination thereof, or a biometric measure of the user, such as fingerprint, facial recognition, voice recognition, iris recognition, etc. The threshold module 128 may store the user's wager thresholds in the threshold database 132. For example, the threshold module 128 may store the user's thresholds in the threshold database 132 such as the amount of money wagered on one bet, such as $100 or time limits, such as if the bet is placed within 10 seconds of the wager being available to the user. The threshold module 128 may store the user's means of authentication in the authenticate database 134. For example, the threshold module 128 may store the means of authentication in the authenticate database 134, such as numeric, letter, or special character passcodes, such as "1234abc!" or a combination thereof, or a biometric measure of the user, such as fingerprint, facial recognition, voice recognition, iris recognition, etc.

Further, embodiments may include an authenticate module 130, which may begin with the authenticate module 130 continuously polling for the wager from the user. For example, the user may place a wager through the wagering app 110, such as the first pitch in the Boston Red Sox vs. New York Yankees event will result in a strike for $200, within 8 seconds of the wagering market being available to the user. The authenticate module 130 may poll for the user ID, such as JS1234, the wager, such as a first-pitch strike in the Boston Red Sox vs. New York Yankees event, the wager amount, such as $200, and the time between when the wagering market opened and when the user placed the wager, such as 8 seconds. The authenticate module 130 may receive the wager from the user. For example, the authenticate module 130 may receive the user ID, such as JS1234, the wager, such as the first-pitch strike in the Boston Red Sox vs. New York Yankees event, the wager amount, such as $200, and the time between when the wagering market opened and when the user placed the wager, such as 8 seconds. The authenticate module 130 may compare the wager amount to the threshold database 132. For example, the authenticate module 130 may compare the received wager amount from the user placing the wager, such as $200, to the threshold database 132 in which the user's threshold is $100. In some embodiments, the authenticate module 130 may use the received user ID to filter the threshold database 132 for the specific user's thresholds. The authenticate module 130 may determine if the wager amount is above the user's threshold. For example, the authenticate module 130 may compare the received wager amount from the user placing the wager, such as $200, to the threshold database 132 wherein the user's threshold is $100, meaning the wager would be over the threshold set by the user in the settings module 114. If the wager amount is below the threshold, the authenticate module may determine if the time in which the wager was placed is below the threshold stored in the threshold database 132. For example, if the user had placed a wager under the $100 amount, the authenticate module 130 may determine if the amount of time from when the wager became available to the user and when the user placed the wager is below the threshold that the user set, such as 10 seconds. Continuing with this example, if the user placed the wager within 8 seconds of the wagering market becoming available, the authenticate module 130 may request a means of authentication from the user. If the wager amount is above the threshold or if the time limit is below the threshold, then the authenticate module 130 may request a means of authentication from the verify module 116. For example, the authenticate module 130 may send a request to the verify module 116 for a means of authentication, such as a numeric, letter, or special character passcodes, such as "1234abc!" or a combination thereof, or a biometric measure of the user, such as fingerprint, facial recognition, voice recognition, iris recognition, etc. The authenticate module 130 may receive the means of authentication from the user. For example, the authenticate module 130 may receive numeric, letter, or special character passcodes, such as "1234abc!" or a combination thereof, or a biometric measure of the user, such as fingerprint, facial recognition, voice recognition, iris recognition, etc. The authenticate module 130 may compare the received means of authentication to the means of authentication stored in the authenticate database 134. For example, the authenticate module 130 may compare the passcode received from the user to the passcode stored in the authenticate database 134 to determine if there is a match. In another example, the authenticate module 130 may compare the biometric of the user, such as fingerprint, facial recognition, voice recognition, iris recognition, etc., to the biometric stored in the authenticate database 134 to determine if there is a match. The authenticate module 130 may determine if there is a match between the received means of authentication and the means of authentication stored in the authenticate database 134. For example, the authenticate module 130 may compare the passcode received to the passcode stored in the authenticate database 134 to determine if there is a match. In another example, the authenticate module 130 may compare the biometric of the user, such as fingerprint, facial recognition, voice recognition, iris recognition, etc., to the biometric stored in the authenticate database 134 to determine if there is a match. If there is a match, the wager may be allowed. For example, if the means of authentication received is the same as one of the means of authentication stored in the authentication database 134, the user may receive a notification that the wager has been placed. If there is no match, the wager may be denied. For example, if authentication received does not match any of the means of authentication stored in the authentication database 134, the user may receive a notification that the wager has been denied or canceled.

Further, embodiments may include a threshold database 132. The threshold database 132 may be created through the process described in the threshold module 128, wherein the threshold module 128 may receive thresholds from the user store them in the threshold database 132. The threshold database 132 may contain the user ID, such as JS1234, the wager amount threshold, such as $100, and the wager time threshold, such as 10 seconds. The threshold database 132 may be used in the process described in the authenticate module 130, wherein the received data from the user placing the wager may be compared to the threshold database 132 to determine if any of the parameters, such as the wager amount or time, exceed or reach the threshold inputted by the user. In some embodiments, the threshold database 132 may contain certain players, teams, events, etc. In some embodiments, the threshold database 132 may contain pressure parameters for players that perform poorly at the end of events or during high-pressure situations, such as for their team to take the lead or preserve a lead. In some embodiments, the threshold database 132 may contain pressure situations for the user, such as wagers at the end of an event, if the user is on a losing streak, such as, losing ten straight wagers, or if the user has placed a certain amount of money over a series of wagers, such as $500 over the course of 10 wagers, etc.

Further, embodiments may include an authenticate database 134. The authenticate database 134 may be created through the process described in the threshold module 128, wherein the threshold module 128 may receive the means of authentication from the user and store them in the authenticate database 134. The authenticate database 134 may contain the user ID, such as JS1234, a passcode, such as "1234abc!", a first biometric, such as a fingerprint, a second biometric, such as facial recognition, and "N" biometric, such as iris recognition, the "N" representing an infinite amount of possible biometrics. The authenticate database 134 may be used in the authenticate module 130 if the user needs to provide a means of authentication to place a wager. In some embodiments, the user may be required to provide multiple means of authentication. In some embodiments, the biometric data may initiate another process such as a fingerprint analysis, facial recognition, or iris recognition process to determine if the received biometric is the same biometric stored in the authenticate database 134. In some embodiments, the data stored in the authenticate database 134 may be stored in a secure database, such as a database that encrypts the data or is stored in a blockchain.

FIG. 2 illustrates the settings module 114. The process may begin with the settings module 114 being initiated, at step 200, by the user. For example, the user may select the settings option on the wagering app 110—which allows them to adjust their preferences—thereby initiating the settings module 114. In some embodiments, threshold and authentication preferences may be listed as a security setting to prevent the user from places wagers that are too high or to limit the wager amounts if the user may have a gambling problem. The settings module 114 may continuously poll, at step 202, for the user to input the wager thresholds. For example, the user may input a threshold regarding the amount of money wagered on a single bet, such as $100. Also, the user may input threshold time limits, such as if the bet is placed within 10 seconds of the wager being available to the user. These limits may prevent the user from making impulse decisions that are previously deemed inappropriate for the user to make. The settings module 114 may receive, at step 204, the user wager threshold inputs. For example, the settings module 114 may receive the wager amount threshold of $100 and the time limit threshold of 10 seconds. In another embodiment, an algorithm or artificial intelligence may determine one or more authentication thresholds by observing the wagering behavior of a cohort of wagers taken from a user, or a group of similar users, and identifying wagers that deviate from the expected pattern. The cohort of wagers may be, for example but not limited to, wagers that share one or more of a common team, a common geolocation, a common wager or prediction amount, wagers by users with similar betting profiles, etc. In some embodiments the cohort of wagers may be a subset of the user's wagering history, or a subset of a single other user's wagering history. This authentication process may provide the user with a second opportunity to determine if the wager should be placed. For example, the system may calculate the historical average wager of a cohort of wagers, and use a variance amount, such as two standard deviations from the average, as the threshold for requiring authentication. The artificial intelligence may also use historical the wagering frequency and timing for a cohort of wagers taken from a user, or a group of similar users, to identify wagers that require authentication. For example, a user may historically make an average of 5 wagers in an NFL game. However, the user has made 5 wagers in the first five minutes of the current NFL game. This may be flagged by an algorithm as a potential errant wager. In another example, team, player, or sport, that a cohort of wagers taken from a user, or a group of similar users, has historically wagered on may be used by the algorithm to identify wagers that may have been made in error. The settings module 114 may prompt, at step 206, the user for the first means of authentication. For example, the first means of authentication may be a numeric, letter, or special character passcodes, such as "1234abc!" or a combination thereof, or a biometric measure of the user, such as fingerprint, facial recognition, voice recognition, iris recognition, etc. The settings module 114 may receive, at step 208, the means of authentication from the user. For example, the settings module 114 may receive the means of authentication, such as a numeric, letter, or special character passcodes, such as "1234abc!" or a combination thereof, or a biometric measure of the user, such as fingerprint, facial recognition, voice recognition, iris recognition, etc. In another embodiment, a second factor of authentication may be required. For example, the user may be asked to input an alphanumeric passcode and provide a biometric authentication such as a fingerprint. Another example may include sending an authentication code to a trusted device as a second authentication factor. In another embodiment, the system may define what means of authentication the user provides. For example, the system may require all users to have both an alphanumeric password and a fingerprint biometric as means of authentication. The system may also have different authentication requirements for different users that may be based on factors such as, user geolocation, local regulations, time the user has had an account, number of historical wagers, total amount wagered with the system, etc. For example, a new user may be required to provide an alphanumeric password, a second device, and a biometric for authentication. Whereas a user who has had an account for over a year may only need to provide a one authentication factor. The system may require geolocation specific authentication factors based on local regulations. For example, a jurisdiction may require a government issued photo ID as a means of authentication. The settings module 114 may determine, at step 210, if the user wants to add another means of authentication. If so, the process may return to step 208. For example, the user may desire to add another means of authentication, such as a numeric, letter, or special character passcodes, such as "1234abc!" or a combination thereof, or a biometric measure of the user, such as fingerprint, facial recognition, voice recognition, iris recognition, etc. If the user does not want to add another means of authentication, the settings module 114 may connect, at step 212, to the threshold module 128. The settings module 114 may send, at step 214, the user wager threshold inputs and means of authentication to the threshold module 128. For example, the settings module 114 may send to the threshold module 128 the thresholds, such as the amount of money wagered on one bet, such as $100, time limits, such as if the bet is placed within 10 seconds of the wager becoming available to the user or the means of authentication, such as a numeric, letter, or special character passcodes, such as "1234abc!" or a combination thereof, or a biometric measure of the user, such as fingerprint, facial recognition, voice recognition, iris recognition, etc.

FIG. 3 illustrates the verify module 116. The process may begin with the verify module 116 continuously polling, at step 300, for a request for authentication from the authenticate module 130. For example, the authenticate module 130 may request authentication from the user if the wager placed exceeds the thresholds set by the user in the settings module 114. Further, if the user wishes for the wager to be placed, they may need to present one or multiple means of authentication such as numeric, letter, or special character passcodes, such as "1234abc!" or a combination thereof, or a biometric measure of the user, such as fingerprint, facial recognition, voice recognition, iris recognition, etc. The verify module 116 may receive, at step 302, a request for authentication from the authenticate module 130. For example, the verify module 116 may receive a request for a means of authentication such as a numeric, letter, or special character passcodes, such as "1234abc!" or a combination thereof, or a biometric measure of the user, such as fingerprint, facial recognition, voice recognition, iris recognition, etc. The user may input, at step 304, the means of authentication. For example, the user may input numeric, letter, or special character passcodes, such as "1234abc!" or a combination thereof, or a biometric measure of the user, such as fingerprint, facial recognition, voice recognition, iris recognition, etc. The verify module 116 may send, at step 306, the means of authentication to the authenticate module 130. For example, the verify module 116 may send the means of authentication, such as a numeric, letter, or special character passcodes, such as "1234abc!" or a combination thereof, or a biometric measure of the user, such as fingerprint, facial recognition, voice recognition, iris recognition, etc., to the authenticate module 130.

FIG. 4 illustrates the threshold module 128. The process may begin with the threshold module 128 connecting, at step 400, to the settings module 114. The threshold module 128 may continuously poll, at step 402, for the user's wager threshold and means of authentication from the settings module 114. For example, the threshold module 128 may continuously poll from the settings module 114 for the thresholds, such as the amount of money wagered on one bet, such as $100, time limits, such as if the bet is placed within 10 seconds of the wager being available to the user or the means of authentication, such as numeric, letter, or special character passcodes, such as "1234abc!" or a combination thereof, or a biometric measure of the user, such as fingerprint, facial recognition, voice recognition, iris recognition, etc. The threshold module 128 may receive, at step 404, the user's wager threshold and means of authentication. For example, the threshold module 128 may receive from the settings module 114, the thresholds, such as the amount of money wagered on one bet, such as $100, time limits, such as if the bet is placed within 10 seconds of the wager being available to the user or the means of authentication, such as numeric, letter, or special character passcodes, such as "1234abc!" or a combination thereof, or a biometric measure of the user, such as fingerprint, facial recognition, voice recognition, iris recognition, etc. The threshold module 128 may store, at step 406, the user's wager thresholds in the threshold database 132. For example, the threshold module 128 may store in the threshold database 132 the thresholds, such as the amount of money wagered on one bet, such as $100 or time limits, such as if the bet is placed within 10 seconds of the wager being available to the user. The threshold module 128 may store, at step 408, the user's means of authentication in the authenticate database 134. For example, the threshold module 128 may stores in the authenticate database 134 the means of authentication, such as a numeric, letter, or special character passcodes, such as "1234abc!" or a combination thereof or a biometric measure of the user, such as fingerprint, facial recognition, voice recognition, iris recognition, etc.

FIG. 5 illustrates the authenticate module 130. The process may begin with the authenticate module 130 continuously polling, at step 500, for the wager from the user. For example, the user may place a wager through the wagering app 110, such as the first pitch in the Boston Red Sox vs. New York Yankees event will result in a strike for $200 within 8 seconds of the wagering market becoming available to the user. The authenticate module 130 may poll for the user ID, such as JS1234, the wager, such as a first-pitch strike in the Boston Red Sox vs. New York Yankees event, the wager amount, such as $200, and the time between when the wagering market opened and when the user placed the wager, such as 8 seconds. The authenticate module 130 may receive, at step 502, the wager from the user. For example, the user may place a wager through the wagering app 110, such as the first pitch in the Boston Red Sox vs. New York Yankees event will result in a strike for $200. The authenticate module 130 may receive the user ID, such as JS1234, the wager, such as a first-pitch strike in the Boston Red Sox vs. New York Yankees event, the wager amount, such as $200, and the time between when the wagering market opened and when the user placed the wager, such as 8 seconds. The authenticate module 130 may compare, at step 504, the wager amount to the threshold database 132. For example, the authenticate module 130 may compare the received wager amount from the user placing the wager, such as $200, to the threshold database 132 wherein the user's threshold is $100. In some embodiments, the authenticate module 130 may use the received user ID to filter the threshold database 132 for the specific user's thresholds. The authenticate module 130 may determine, at step 506, if the wager amount is above the user's threshold. For example, the authenticate module 130 may compare the received wager amount received from the user placing the wager, such as $200, to the threshold database 132. If the wager amount is below the threshold, the authenticate module 130 may determine, at step 508, if the time in which the wager was placed is below the threshold stored in the threshold database 132. For example, if the user had placed a wager under the $100 amount, the authenticate module 130 may determine if the amount of time from the wager being available to the user placing the wager is below the threshold that the user set, such as 10 seconds. If the wager amount is below the threshold and the time limit is above the threshold, the authenticate module 130 may skip to step 518. If the wager amount is above the threshold and/or if the time limit is below the threshold, the authenticate module 130 may request, at step 510, a means of authentication from the verify module 116. For example, the authenticate module 130 may request a means of authentication from the verify module 116, such as a numeric, letter, or special character passcode, such as "1234abc!" or a combination thereof, or a biometric measure of the user, such as fingerprint, facial recognition, voice recognition, iris recognition, etc. The authenticate module 130 may receive, at step 512, the means of authentication from the user. For example, the authenticate module 130 may receive numeric, letter, or special character passcodes, such as "1234abc!" or a combination thereof, or a biometric measure of the user, such as fingerprint, facial recognition, voice recognition, iris recognition, etc. The authenticate module 130 may compare, at step 514, the received means of authentication to the means of authentication stored in the authenticate database 134. For example, the authenticate module 130 may compare the passcode received to the passcode stored in the authenticate database 134 to determine if there is a match. In another example, the authenticate module 130 may compare the biometric of the user, such as fingerprint, facial recognition, voice recognition, iris recognition, etc., to the biometric stored in the authenticate database 134 to determine if there is a match. The authenticate module 130 may determine, at step 516, if there is a match between the received means of authentication and the means of authentication stored in the authenticate database 134. For example, the authenticate module 130 may compare the passcode received to the passcode stored in the authenticate database 134 to determine if there is a match. In another example, the authenticate module 130 may compare the biometric of the user, such as fingerprint, facial recognition, voice recognition, iris recognition, etc., to the biometric stored in the authenticate database 134 to determine if there is a match. If there is a match, the wager may be allowed at step 518. For example, if authentication received matches the means of authentication stored in the authentication database 134, the user may receive a notification that the wager has been placed. If there is not a match, the wager may be denied at step 520. For example, if authentication received does not match any of the means of authentication stored in the authentication database 134, the user may receive a notification that the wager has been denied or canceled.

FIG. 6 illustrates the threshold database 132. The threshold database 132 may be created through the process described in the threshold module 128, wherein the threshold module 128 may receive thresholds from the user, and the thresholds are stored in the threshold database 132. The threshold database 132 may contain the user ID, such as JS1234, the wager amount threshold, such as $100, and the wager time threshold, such as 10 seconds. The threshold database 132 may be used in the process described in the authenticate module 130 wherein the received data from the user placing the wager is compared to the threshold database 132 to determine if any of the parameters, such as the wager amount or wager time, exceed or reach the threshold set by the user. In some embodiments, the threshold database 132 may contain certain players, teams, events, etc. In some embodiments, the threshold database 132 may contain pressure parameters for players that perform poorly at the end of events or in high-pressure situations, such as for their team to take the lead or preserve a lead. In some embodiments, the threshold database 132 may contain pressure situations for the user, such as wagers at the end of an event, if the user is on a losing streak, for example, losing ten straight wagers, if the user has placed a certain amount of money over of a series of wagers, such as $500 over the course of 10 wagers, etc.

FIG. 7 illustrates the authenticate database 134. The authenticate database 134 is created through the process described in the threshold module 128, wherein the threshold module 128 may receive the means of authentication from the user and the means of authentication may be stored in the authenticate database 134. The authenticate database 134 may contain the user ID, such as JS1234, a passcode, such as "1234abc!", a first biometric, such as a fingerprint, a second biometric, such as facial recognition, and "N" biometric, such as iris recognition, the "N" representing an infinite amount of possible biometrics. The authenticate database 134 may be used in the authenticate module 130 if the user needs to provide a means of authentication to place a wager. In some embodiments, the user may be required to provide multiple means of authentication. In some embodiments, the biometric data may initiate another process such as a fingerprint analysis, facial recognition, or iris recognition process to determine if the received biometric is the same biometric stored in the authenticate database 134. In some embodiments, the data stored in the authenticate database 134 may be stored in a secure database, such as a database that encrypts the data or is stored in a blockchain.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method, executed on a processor, comprising:

inputting a set threshold onto a wagering network, wherein the set threshold is set by artificial intelligence based on wagering behavior of a cohort of similar wagers;

inputting at least one authentication criteria onto the wagering network;

receiving at least one wager from a user;

receiving a first authentication criterion;

determining that the at least one wager exceeds the set threshold; and determining validity of the first authentication criterion.

2. The computer implemented method of claim 1, further comprising:

displaying at least one message of approval or rejection of the wager to the user.

3. The computer implemented method of claim 1, further comprising:

inputting at least one user-set threshold and at least one user-set authentication criterion.

4. The computer implemented method of claim 3, wherein the set threshold is at least one of a wager money limit or a time limit and the set authentication criterion is at least one of a passcode or a biometric measure.

5. The computer implemented method of claim 1, further comprising:

use of one or more of geolocation, local regulations, an account creation date, a number of historical wagers, or a total amount wagered to generate at least one system-set threshold or at least one system-set authentication criterion.

6. The computer implemented method of claim 1, wherein the cohort of similar wagers are wagers placed on the same teams.

7. The computer implemented method of claim 1, wherein the at least one authentication criterion is set by artificial intelligence.

8. The computer implemented method of claim 1, wherein the cohort of similar wagers are selected from wagers of a bettor.

9. The computer implemented method of claim 1, wherein the cohort of similar wagers are selected from wagers of two or more similar bettors.

10. A system comprising:

a settings module, executed by at least one processor, configured to allow input of at least one threshold and at least one authentication criterion from the system or from a user, wherein the at least one threshold is set by artificial intelligence;

a threshold module, executed by the at least one processor, configured to obtain data from the settings module and store data in at least one database or at least one blockchain;

an authenticate module, executed by the at least one processor, configured to obtain data from the user and compare data to the at least one database or the at least one blockchain;

a threshold database configured to store the at least one threshold that is accessible via the threshold module and the authenticate module;

an authenticate database configured to store the at least one authentication criterion, wherein the authenticate database is accessible via the threshold module and the authenticate module;

a device configured to communicate with the authenticate module and display a message; and an interface configured to relay the message to the user.

11. The system of claim 10, wherein artificial intelligence is configured to determine deviations from at least one wagering pattern of a cohort of wagers by calculating an average wager of the cohort of wagers, utilizing a standard deviation variance amount, and calculating at least a wagering frequency and timing of the cohort of wagers.

12. The system of claim 11, wherein the message is displayed after the artificial intelligence detects a deviation in the wagering pattern of the cohort of wagers.

13. The system of claim 10, wherein the settings module is further configured to communicate with the threshold module.

14. The system of claim 10, wherein the data obtained by the authenticate module is a wager of the user.

15. The system of claim 14, wherein the authenticate module is further configured to determine that at least one of a wager amount or a time exceeds the at least one threshold set in the threshold database.

16. The system of claim 10, wherein the message sent to the device is a notification of approval or rejection of a wager by the user.

17. The system of claim 10, wherein the threshold database and the authenticate database are configured to encrypt the data stored therein.

18. The system of claim 10, wherein the settings module is further configured to utilize artificial intelligence to determine authentication requirements based on geolocation, local regulations, an account creation date, a number of historical wagers, or a total amount wagered.

19. The system of claim 10, wherein the cohort of wagers are selected from wagers of a bettor.

20. The system of claim 10, wherein the cohort of wagers are selected from wagers of two or more similar bettors.

* * * * *